June 27, 1967 D. E. BEDUHN 3,327,856
APPARATUS FOR FILTERING FLUID
Filed July 22, 1963 2 Sheets-Sheet 1
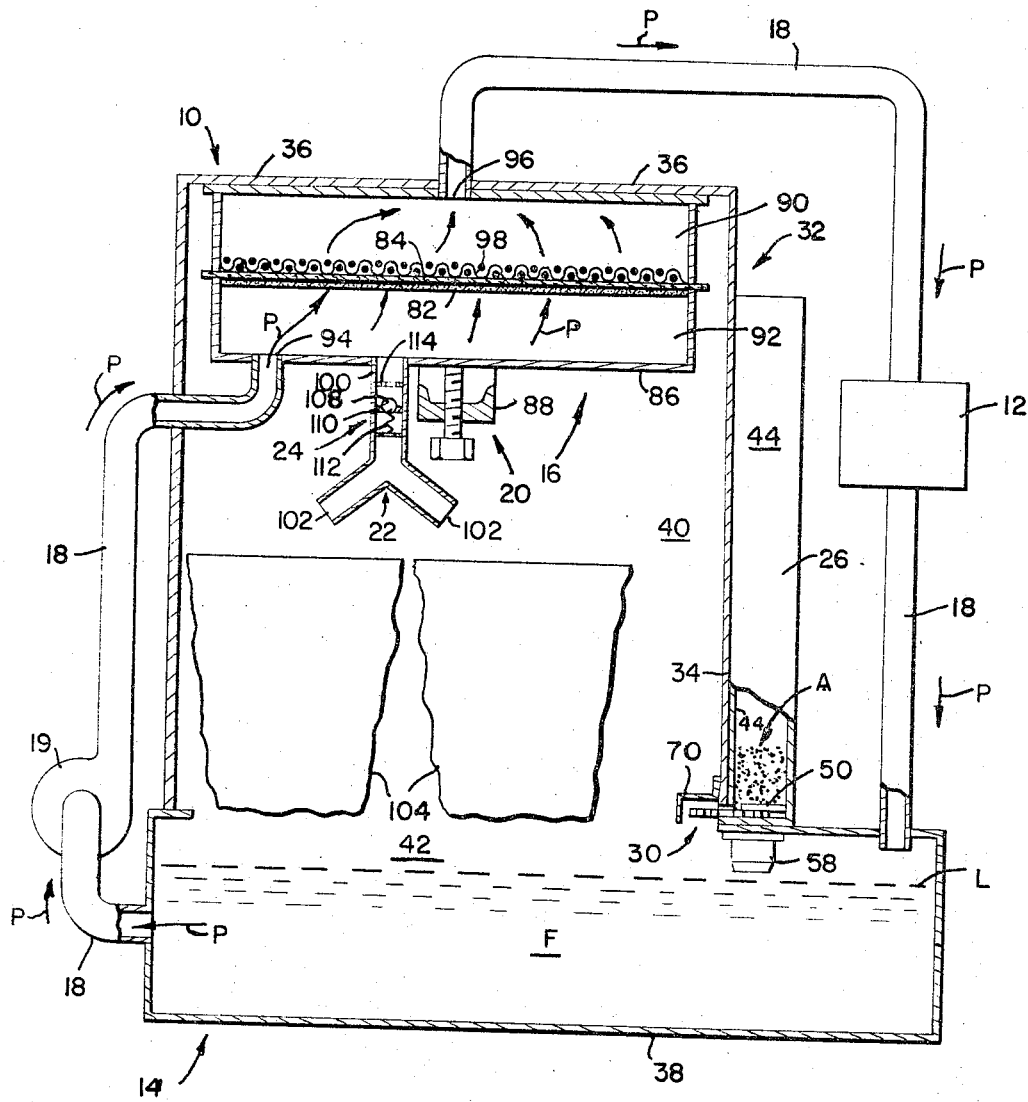
INVENTOR.
DANIEL E. BEDUHN

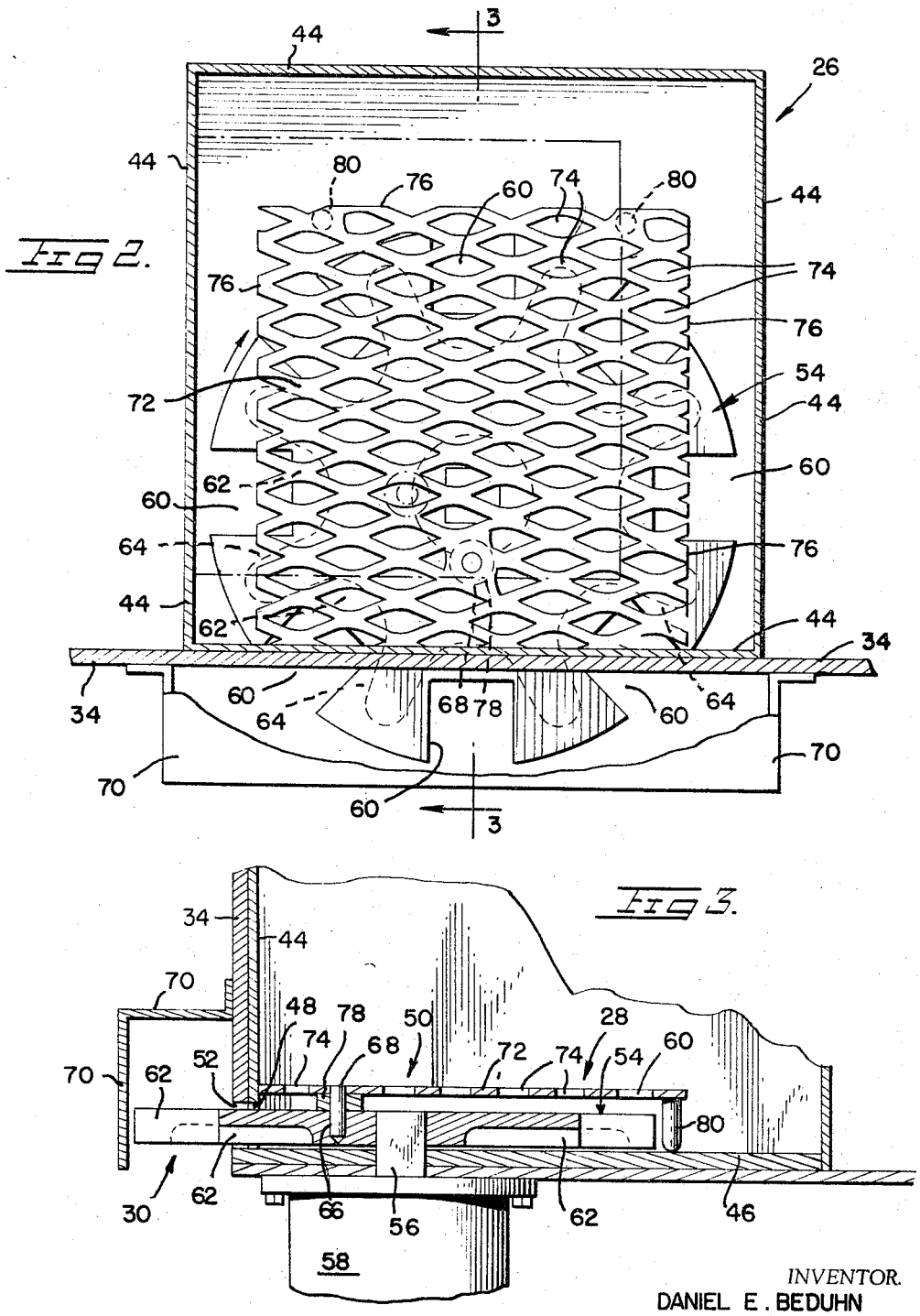

United States Patent Office 3,327,856
Patented June 27, 1967

3,327,856
APPARATUS FOR FILTERING FLUID
Daniel E. Beduhn, Manitowoc, Wis., assignor to The Manitowoc Company Inc., Manitowoc, Wis., a corporation of Wisconsin
Filed July 22, 1963, Ser. No. 296,530
27 Claims. (Cl. 210—136)

The present invention relates to a filtering system and more particularly to improved apparatus for such a system for removing dirt, undesirable matter, impurities and other contaminants from a fluid.

It is an object of the present invention to provide an improved apparatus for a filtering system in which dirt, undesirable matter, impurities and other contaminants which are suspended in a fluid, such as a cleaning solvent or the like, are removed therefrom by passing the fluid through a filtering arrangement comprising a primary filter and a secondary filter disposed in series relationship relative to each other and in which one of the filters consists of a filter aid material.

It is another object of the present invention to provide an improved apparatus for a filtering system having a fine filter and a coarse filter disposed in series relationship relative to each other and in which the fluid to be filtered or purified is flowed first through the coarse filter and thereafter through the fine filter so that the coarse filter will remove a portion of the dirt, undesirable matter, impurities or other contaminants carried by the fluid and will thus increase the serviceable life of the fine filter.

It is another object of the present invention to provide an improved apparatus for a filtering system having a fine filter made of a fibrous material such as paper or the like and a more coarse filter consisting of filter aid material in which the filter aid material is removed from the filtering system at periodic intervals and replaced with fresh filter aid material.

It is another object of the present invention to provide an improved apparatus for a filtering system in which fluid containing suspended dirt, undesirable matter, impurities or other types of contaminants is circulated through a filter arrangement comprising a series of filters in the filter system so as to remove the dirt, undesirable matter, impurities and other contaminants from the fluid so that the fluid may be continuously reused, and in which a predetermined quantity of filter aid material forms one of the filters in the system and provides a first filter of the series in the system and is disposed to the upstream side of a fine fibrous filter of the series in the system.

It is another object of the present invention to provide an improved apparatus for a filtering system having a coarse filter and a fine filter disposed in series relationship relative to each other, with the coarse filter being disposed to the upstream side of the fine filter so that fluid to be cleaned passes first through the coarse filter consisting of filter aid material which, when contaminated, is removed therefrom and a fresh quantity of filter aid material is replaced thereat without requiring dismantling of the component parts of the system or any physical contact or movement of the fine filter.

It is another object of the present invention to provide an improved apparatus for a filtering system for cleaning suspended dirt, undesirable matter, impurities and other contaminants from a fluid circulated therethrough in which a predetermined quantity of fresh filter aid material is circulated in the system and defines a coarse filter disposed to the upstream side of a fine filter with the filter aid material being automatically removed from the circulating system when contaminated and replaced by a quantity of fresh filter aid material to form a rejuvenated coarse filter for the system.

It is another object of the present invention to provide an improved apparatus for a filtering system comprising a two-stage filter arrangement with the first stage being a coarse filter having filter aid material and the second stage having a fibrous compounded material such as paper, with a device for dispensing a preselected or predetermined quantity of filter aid material into the system for forming the first filter stage.

It is another object of the present invention to provide an improved apparatus for a filtering system having metering device for dispensing into a fluid to be filtered or purified a predetermined quantity of filter aid material to form a coarse filter in the system, such metering device being provided with a storage area defined by a tank or container in which structure is provided for preventing any of the filter aid material from bridging, bulking, or hanging up in the storage area so that a precise quantity of filter aid material may be readily introduced into the fluid which is being filtered or purified.

It is another object of the present invention to provide an improved apparatus for a filtering system for filtering dirts, impurities, undesirable matter and other contaminants which may be suspended in a fluid which is being circulated under pressure through a two-stage filter arrangement, one of which stages comprises a filter aid material and the other of such stages comprising a fibrous compounded material disposed in series relationship therewith, wherein the filter aid material when contaminated is discharged from the system while the fluid being filtered or purified by the system is returned to a reservoir therein through forces created by gravity.

It is another object of the present invention to provide an improved apparatus for a filtering system wherein fluid to be filtered or purified is passed through a filter aid material, which filter aid material is introduced into the fluid in predetermined quantities by a metering device, and structure is provided in the metering device to prevent any bridging, bulking or hanging up of the filter aid material so that a measured quantity may be automatically introduced into the fluid, and in which valving is provided in the system for automatically dumping and discharging from the system any contaminated filter aid material, together with equipment for coating a fibrous compounded filter material with the filter aid material that has been freshly introduced into the fluid.

It is another object of the present invention to provide an improved apparatus for a filtering system having a metering device for injecting into a fluid to be filtered or purified a predetermined quantity of filter aid material, which metering device is provided with structure having feeder-agitator mechanism for continuously agitating the filter aid material which is to be injected into the fluid, with the mechanism being located within the confines of a filter aid storage area so that the mechanism effectively forms a movable bottom portion and prevents any bridging, bulking or hanging up of the filter aid material therein, together with an assembly for enabling a precise measured quantity of the filter aid material to be dispensed from the storage area and introduced and injected into the fluid as needed or desired.

It is another object of the present invention to provide an improved apparatus for a filtering system for filtering or purifying fluid carrying suspended dirt, undesirable matter, impurities and other contaminants, in which the fluid is passed through a filter aid material and a fibrous filter material such as paper or the like located to the downstream side of the filter aid material and in which injection of the filter aid material in predetermined quantities is accomplished by a metering device as periodic intervals or cycles, and any contaminated filter aid material is removed from the system through forces created by gravity at periodic intervals or cycles and replaced by fresh filter aid material while the fibrous filter material is prevented from becoming overloaded and thereby has the serviceable life thereof greatly increased and prolonged.

Other objects, advantages and important features of the invention will be apparent from a study of the specification following, taken with the drawing, which together describe, disclose and illustrate an embodiment or modification of the invention and what is now considered and believed to be the best mode of practicing the principles thereof. Still other embodiments or modifications may be suggested to those having the benefit of the teachings herein, and such other embodiments or modifications are each intended to be reserved especially as they fall within the scope and breadth of the subjoined claims.

In the drawing:

FIGURE 1 is a schematic side elevational assembly type view of improved apparatus in a filtering system which employs a novel method or process of filtering or purifying a fluid and having various component parts illustrated in cooperative relationship relative to each other for performing an improved method or process of filtering a fluid;

FIGURE 2 is an enlarged plan view illustrating the details of a metering device which forms a part of the apparatus illustrated in FIGURE 1, which effectively stores, measures and dispenses a given quantity of filter aid material into the system, and FIGURE 3 is a partial side elevational sectional view taken along the line 3—3 of FIGURE 2, looking in the direction of the arrows, and illustrating structure having mechanism for feeding and agitating such filter aid material while the material is confined therein and an assembly for measuring and dispensing the given quantity thereof into the system while effectively preventing the filter aid material from bridging, bulking and hanging up in the storage area of the device.

Attention is now directed to FIGURE 1 of the drawing wherein there is illustrated a system 10 for filtering or otherwise purifying a fluid F which is passed along a flow path P in a given direction through the system 10 as indicated by the solid arrows in FIGURE 1 of the drawing. The system 10 is provided with various component parts such as a unit 12 in which the fluid F is operable, a filtering unit 14 whereat the fluid F is filtered or purified by a filtering arrangement 16 with suitable conduit and pumping means 18 being provided for passing the fluid F between the unit 12 and the filtering unit 14 and thus create a closed circuit type of filter system.

The improved apparatus 20 of this invention which enables the system 10 to employ a novel method or process comprises the filtering unit 16 together with equipment 22, valving 24 and a metering device 26 for storing, measuring and dispensing a given quantity of a filter aid material A into the fluid F of the system 10 with the metering device 26 being provided with structure 28 for preventing the filter aid material A from bridging, bulking or hanging up while being stored in the metering device 26 and an assembly 30 for measuring and dispensing the desired given quantity of the filter aid material A.

As illustrated in FIGURE 1 of the drawing, the component parts of the system 10 together with the apparatus 20 are each interrelated and interconnected in cooperable and operative relationship relative to each other as will be explained in more detail hereinafter.

For the purpose of illustration, the system of this invention has been shown in the drawing and shall be described and disclosed herein as relating to a dry cleaning operation wherein the fluid F is a duty cleaning solvent with the unit 12 preferably being a washer-extractor comprising a tumbler or drum in which the fluid F is effective to dry clean soiled garments, clothing or other similar and like articles.

Further, the fluid F is introduced into the unit 12 and agitated therein so as to thoroughly immerse the articles and remove therefrom any dirt, undesirable matter, impurities and other contaminants. Thereafter, the fluid F is discharged along the flow path P from the unit 12 through a suitable part of the conduit means 18 and delivered to the filtering unit 14 wherein the dirt, undesirable matter, impurities or other contaminants are removed therefrom and the fluid F is cleaned or purified so that the fluid F may be reused in another cycle of the system 10 to clean another bundle or batch of soiled articles.

The filtering unit 14 is provided with a generally large upright or upstanding casing or housing 32 as shown in FIGURE 1 of the drawing having generally vertically disposed side walls 34, a top wall portion 36 and a bottom wall portion 38. The housing 32 is in effect divided into an upper chamber 40 and a lower chamber 42 with the filtering arrangement 16 being disposed in the upper chamber 40 and the lower chamber 42 of the housing 32 defining a reservoir for the fluid F.

It is to be noted that the upper 40 and lower 42 chambers of the housing 32 are open and substantially unobstructed to enable communication for the fluid F between the reservoir defined by the lower chamber 42 and the location in the upper chamber 40 whereat the filtering arrangement 16 is positioned. The reservoir defined by the lower chamber 42 is substantially horizontally disposed and extends substantially throughout the full extent of the housing 32 and it is to be understood that the housing 32 may be formed from a plurality of side walls 34 which, as illustrated, would be suitably secured by any suitable means in a liquid-tight relationship relative to each other. The reservoir in the lower chamber 42 is preferably maintained substantially filled to a level L, as shown in FIGURE 1, in the dry cleaning system 10, as illustrated, preferably of a liquid dry cleaning solvent such as fluorinated hydrocarbon.

Since such dry cleaning solvents generally in use today are readily volatile and will evaporate, the housing 32 is substantially airtight and closed to the atmosphere.

The metering device 26 is attached by any suitable means or in any suitable manner to the housing 32 of filtering unit 14 and, as illustrated in FIGURE 1 of the drawing, the metering device 26 is positioned in upwardly spaced relationship to the reservoir in the lower chamber 42 of the housing 32. The metering device 26 is provided with upstanding side portions 44 which, as illustrated in FIGURE 2 of the drawing, define a storage area wherein the filter aid material A may be stored and confined for future use in the filtering system 10. In the lower portion of the metering device 26 there is provided the structure 28 which prevents the filter aid material A from bridging, bulking or hanging up while being confined in the metering device 26 and the assembly 30 which measures and dispenses the given quantity of the filter aid material A into the reservoir in the lower portion 42 of the housing 32 whereat the dispensed given quantity of the filter aid material A is mixed with the fluid F.

The metering device 26 is provided with a bottom portion 46 which may, as illustrated in FIGURE 3 of the drawing, be tapered or beveled to define a substantially downwardly inclined slope that leads toward a discharge opening 48 that is provided in one of the side portions 44 of the metering device. In this way, as the filter aid material A is urged downwardly by reason of a feeder-agitator mechanism 50 of the structure 28 into dispensible position relative to the assembly 30, there will be a tendency for the filter aid material A to naturally follow or slide toward the dispensing opening 48.

It is to be noted that the side wall 34 of the filtering unit 14 which is adjacent to the one side portion 44 of the metering device 26 is provided with an opening 52 therein which is disposed in alignment with the discharge opening 48 to enable the measured given quantity of the filter aid material A to pass therethrough and thence into the fluid F that is contained in the reservoir of the lower chamber 42.

The dispensing, measuring and metering assembly 30 comprises a disk-like or wheel member 54 which is rotatably disposed in the bottom portion 46 of the metering device 26 by drive shaft means 56 and suitable driving means 58 such as an electric motor or the like is provided for powering, actuating, operating or otherwise rotating the member 54 relative to the metering device 26 in the direction of the arrow as shown in FIGURE 2 of the drawing. The driving means 58 may also comprise a reducer unit, not illustrated, which may variably control the rotational speed of the drive shaft means 56 and thus it is possible to variably control the rotation of the member 54.

As illustrated in FIGURE 2 of the drawing, the axis about which the member 54 rotates relative to the metering device 26 is located so that a substantial portion of the member 54 will pass through the aligned openings 48 and 52 during the rotation of the member 54 by the drive shaft means 56.

The substantial portion of the member 54 is to be noted as being substantially spaced from that side portion 44 of the metering device 26 which is opposed to the one side portion 44 that is provided with the discharge opening 48, provided in the peripheral extremities of the member 54 and circumferentially spaced in the substantial portion thereof that passes through the openings 48 and 52 there is a plurality of recesses 60 leading to pockets 62. The recesses 60 are illustrated as being of substantially rectangular configuration with the pockets 62 being arcuate and defined by generally radially outwardly extending finger-like portions which define upstanding wall portions 64 that have a sufficient thickness to urge any portion of the filter aid material A which may pass into the confines defined by the wall portions 64 so that on rotation of the member 54 the wall portion 64 will urge the confined portions of the filter aid material toward and through the openings 48 and 52 whereat the portions of the filter aid material A will then pass into the fluid F in the reservoir in the lower chamber 42 of the filtering unit 14.

In passing, it is to be understood that the size and configuration of the recesses 60 and pockets 62 as well as the wall portions 64 of the member 54 may be varied and take any desired size, shape or configuration and, in this way, it is possible to control the volume of the filter aid material A which may pass into the confines thereof and thus meter, measure or otherwise acquire and control the desired quantity of the filter aid material A which is passed into the fluid F.

The central portion of the member 54 defines a hub wherein the drive shaft means 56 is secured and in generally radially outwardly spaced relationship relative thereto there is provided a bore 66 in which there is relatively movably disposed a securement 68 which, as illustrated in FIGURE 3 of the drawing, is preferably shown as a pin-like element.

Rigidly secured to the element 68 for shifting movement relative to the member 54 of the assembly 30 is the feeder-agitator mechanism of the strucure 28 for preventing the filter aid material A from bridging, bulking or hanging up while being stored in the metering device 26 and the structure 28 comprises the feeder-agitator mechanism 50 which during the rotation of the member 58 will sweep or shift through the lower portion of the metering device 26 in the storage area thereof which is upwardly spaced from the member 54 and thus agitate and, in effect, feed the filter aid material A into the recesses 60 and pockets 62 of the member 54.

The feeder-agitator mechanism 50 is illustrated as being of substantially rectangular configuration corresponding to the configuration of the metering device 26 as defined by the side portions 44 with the mechanism comprising a substantially flat perforated plate-like member having a plurality of apertures 74 formed therein.

As illustrated in FIGURE 2 of the drawing, the member 72 is shown as being made from expanded metal which defines the apertures 74. However, it is to be understood that other materials may be employed than expanded metal for forming the mechanism 70 wherein such other materials may be perforated in a manner which will enable the filter aid material A to pass therethrough during the sweeping or shifting action of the mechanism 50.

It is to be noted that the lateral extent of the member 72 is substantially less than the area of the lateral extent of the metering device 26 as defined by the side portions 44 thereof and the eccentric offset disposition of the element 68 in the bore 66 relative to the axis of rotation of the member 54 through the drive shaft means 56 will cause the edge portions 76 of the member 72 to engage the corresponding side portions 44 of the metering device 26 during the sweeping or shifting action of the member 72 in response to the rotation of the member 54 and in FIGURE 2 of the drawing one extreme position of the member 72 is illustrated in solid lines with the other extreme portions thereof being shown in dotted line.

In order to maintain the member 72 of the feeder-agitator mechanism 50 in upwardly spaced relationship relative to the member 54 a bushing 78 is disposed about the element 68 intermediate the members 54 and 72 and rigidly secured to the member 72 for movement therewith and depending therefrom at a location which is generally radially outwardly spaced from the peripheral edge of the member 54, there is provided projections 80 which engage the bottom portion 46 of the metering device 26 so that the members 54 and 72 are disposed in substantially parallel relationship relative to each other during the rotational movement of the member 54 and the sweeping or shifting movement of the member 72.

In operation, on actuation of the driving means 58, the member 54 is rotated in the direction illustrated by the arrow in FIGURE 2 of the drawing, and by reason of the eccentric offset location of the securement 68 the member 72 will sweep or shift completely across the area of the lower portion of the metering device 26 with the edge portion 76 of the member 72 engaging the corresponding side portions 44 of the metering device 26 and thus the member 72 will prevent the bridging, bulking or hanging up of the filter aid material A that is in the lower portion of the metering device 26 and cause the filter aid material to pass through the apertures or perforations 74 into the recesses 60 and then to the pockets 62 whereat the wall portion 64 will urge the measured portions or quantity of the filter aid material A to pass through the discharge opening 48 and the opening 52 into the fluid F in the reservoir in the lower chamber 42 of the filtering unit 14.

In this way, a predetermined measured quantity of filter aid material will be sequentially, at periodic intervals during the cycle of operation of the system 10, dispensed into the fluid F with such dispensement being variable and controllable by the actuation of the driving means 58.

The fluid F when recharged by the quantity of filter aid material A and which has the dirt, undesirable matter, impurities and other contaminants carried thereby is then placed in communication with the filtering arrangement 16 through the suitable conduit 18 and pumping means 19 whereat the fluid F is filtered or purified by a series of filters, each of which may have different characteristics and which are created by different materials wherein the first filter of this series is a coarse filter 82 with the characteristics of the series of filters in the filtering arrangement 16 progressively becoming finer in the downstream direction of the passage of the fluid F through the system 10. As illustrated in FIGURE 1 of the drawing, the filtering arrangement 16 comprises a pair of filters formed of different materials with the upstream coarse filter 82 defining a preliminary filter formed essentially of the filter aid material A and a fine filter 84 which is to the downstream side of the filter 82 creating a secondary filter formed of fibrous material such as paper.

The filtering arrangement 16 comprises a housing or casing 86 in which the filters 82 and 84 are positioned with the housing 86 being located within the confines of the upper chamber 40 of the filter unit 14 and secured therein by any suitable means 88 such as a U-shaped clamp and bolt or the like.

The housing 86 is preferably formed of upper 90 and lower 92 sections with the lower section 92 having an intake opening 94 therein for receiving the fluid F from the reservoir in the lower chamber 42 through the conduit means 18, and the upper section 90 is provided with a discharge opening 96 through which the fluid F passes after being filtered or purified through the conduit means 18 to the intake side of the unit 12.

The secondary or fine filter 84 is preferably formed of fibrous porous compounded material, such as a paper which, if required, may be impregnated with a resin and is positioned, secured and maintained between the housing sections 90 and 92 in a manner so that the filter material 84 is substantially horizontally disposed and extends throughout substantially the full lateral area extent of the housing 86 intermediate the intake opening 94 and the discharge opening 96 formed respectively in the lower 92 and the upper 90 sections thereof.

The disposition and type of filter material which forms the secondary or fine filter 84 thus creates a positive or absolute type filtering surface which will be capable of filtering or in other ways purifying the fluid F by removing therefrom any dirt, undesirable matter, impurities and other types of contaminants which may have a size not less than 1 micron.

Disposed to the downstream side of the fine filter 84, that is above the fine filter 84 as in FIGURE 1 of the drawing, in overlying relationship thereto and substantially coextensive therewith, is a woven wire cloth or screen filter member 98 which is effective to provide support to the fine filter 84 throughout the full lateral area extent thereof as the fluid F is being forced therethrough under pressure by the action of the pump means 19.

In operation, as the fluid F is forced by reason of the pump conduit means 18 from the reservoir in the lower chamber 42 of the filtering unit 14 through the fine filter 84, the filter aid material A which has been dispensed into the fluid F will be disposed on the upstream side of the fine filter 84, that is, below the fine filter 84 as viewed in FIGURE 1 of the drawing, and will thus form or create a layer or cake of filter material thereon to define the coarse or preliminary filter 82 of the filtering arrangement 16.

The cake or layer of filter aid material A will be maintained on the upstream side of the filter 84 by the pressure force created by the pump means 19 with the preliminary or coarse filter being the first stage of a series of filters, with the second stage thereof being the fine filter 84. The filter 84 will provide the fine filtration of the dirt, undesirable matter, impurities and other contaminants which are in the fluid F and which are not absorbed or removed therefrom by the action of the coarse filter aid material A of the filter 82. The filter 82, through the action of the filter aid material A, will remove a great deal and large portion of the dirt, undesirable matter, impurities and other contaminants from the fluid F which would ordinarily or normally clog the fibrous material of the filter 84 prematurely and thus the serviceable life of the fine fibrous material filter 84 will be extended and prolonged so as not to require the replacement thereof at frequent intervals.

The equipment 22 of the apparatus 20 is effective and operable to backwash the fluid F in the system 10 and clean the coating or layer of filter aid material A that has been deposited on the filter 84 and the equipment 22 comprises a backwash line or conduit means 100 which extends through the lower section 92 of the housing 86 of the filtering arrangement 16 in open communication with the interior thereof. The backwash line or conduit means 100 is provided with or is divided into a plurality of branch lines or connections 102 at the lower end portion thereof for discharging any contaminated filter aid material A or sludge formed from the dirt, undesirable matter, impurities or other contaminants into sludge containers or bags 104, one for each of the branch connections 102, as will be described and disclosed in more detail hereinafter. The sludge bags or containers 104 are each preferably formed of fine nylon mesh material and are suitably secured and positioned by conventional means, not illustrated, within the upper chamber 40 of the filtering unit 14 in an area thereof which is directly below the filtering arrangement 16 and directly above the reservoir in the lower chamber 42. The sludge bags or containers 104 are effective to enable and permit any of the fluid F which may be disposed therein to pass through the porous mesh material thereof while preventing any sludge or contaminated filter aid material A to be retained therein.

A shield 70 is provided within the confines of the housing 32 which projects generally inwardly therefrom at a location which is adjacent the opening 52 in the one side portion 44 to protect the quantity of filter aid material A that is being dispensed by the metering device 26 from the drippings of the fluid F through the bags or containers 104.

The valving 24 of the apparatus 20 is disposed within the backwash line or conduit means 100 at a location therein which is intermediate the lower section 92 and the branch lines or connections 102, with the valving 24 comprising one-way check valve means having a spring-biased ball element 108 seating on a valve seat 110 and normally biased and maintained to an open position in unseated relationship to the seat 110 by a bias 112 when the pump means 18 is not in operation. A stop member 114 is provided for limiting the movement of the ball element 108. With the pump means 19 in operation, the pressures created thereby which act on the fluid F will cause the ball element 108 to engage the seat 110 and thus close the passage of fluid through the backwash line or conduit means 100 while when the pump means 19 is not in operation such pressure does not exist and the valve element 108 will leave the seat 110 and open the passage through the backwash line or conduit means 100.

In operation, when it is desired to place the fluid F which has been filtered or purified at the unit 12 wherein the fluid F will be effective to perform its intended function which, as illustrated in the drawing and as described and disclosed herein, is the dry cleaning of a batch of garments, the pump 19 and conduit means 18 is actuated and placed in operation to pump under pressure the fluid F therethrough so that the fluid F passes from the reservoir in the lower chamber 42 of the filtering unit 14, through the filtering arrangement 16 and thence to the intake side of the unit 12.

In most installations, the operation of the system 10 will be substantially continuous with a supply of filtered and purified fluid F being available for the unit 12 and, in such installations wherein the operation is substantially continuous, the driving means 58 of the metering device 26 is also placed in operation with the storage area of the metering device 26 being supplied with a quantity of the filter aid material A which in a dry cleaning operation may be diatomite, commonly known as diatomaceous earth, which may also contain some sweetener powder or carbon if desired. As the contaminated fluid F is returned from the discharge side of the unit 12 to the reservoir in the lower portion 42 of the filtering unit 14, the pump 19 and conduit means 18 will then force the fluid F under pressure to the lower section 92 of the filtering unit 16. While the fluid F is in the reservoir in the lower chamber 42 of the filtering unit 14 of the system 10, the metering device 26 will continuously at periodic intervals dispense or inject a predetermined quantity of the filter aid material A into the fluid F and thus the fluid F, on entering the lower section 92 of the filtering arrangement 16, will have the additional fresh filter aid material A contained therein.

It has been found that in a dry cleaning operation, such as that illustrated and described and disclosed herein, wherein the fluid F is a liquid solvent such as fluorinated hydrocarbon and the filter aid material A is diatomite, the employment of the two-stage filter arrangement 16 will actually reduce the quantity of the filter aid material A that is normally required in such dry cleaning operation. For example, in cleaning a 20-pound batch of garments in a coin-controlled self-operated dry cleaning system, it has been found that approximately two tenths (0.2) of a pound of the filter aid material is needed.

When the requirements of the unit 12 have been satisfied and the performance thereof completed, the pump 19 and conduit means 18 is deenergized and shut down to a non-operating condition and the driving means 58 of the metering device 26 is placed in a similar condition. As stated previously, the pressurized condition of the fluid F on passing through the pump 19 and conduit means 18 maintains the valving 24 closed so that the fluid F does not discharge through the backwash line or conduit means 100. However, when the pump 19 and conduit means 18 is shut off to an inoperative condition, the valving 24 is opened through the bias 112 that moves the ball element 108 off of the seat 110 from the lower section 92 in communication with the backwash line or conduit means 100 so that the fluid F which is in the housing 86 of the filtering arrangement 16 will backwash through the forces created by gravity through the fine 84 and coarse 82 filters, and thus remove the cake or layer of the filter aid material 82 that was held or deposited on the surface of the fine filter 84 with the forces created by gravity causing the disengaged contaminated filter aid material 82 to be discharged down through the backwash line or conduit means 100 to the branches 102 thereof, and thence into the sludge bags or containers 104. The material of the sludge bags or containers 104 will enable any of the fluid F that flows therein to pass therethrough and drip back into the reservoir while retaining any of the filter aid material A or sludge therein. From time to time, it is necessary to empty the sludge and the filter aid material A from the bags or containers 104 as they progressively become filled. As the demands of the unit 12 are again required, it is only necessary to activate or place in operation the pump 19 and conduit means 18 and the driving means 58 of the system 10 which may be easily controlled by any conventional type of coin mechanism, not illustrated, so that the cycle of the operation of the system 10 may be repeated as required, with fresh filter aid material being placed on the surface of the fine filter 84 by reason of the fact that additional filter aid material A is periodically being dispensed into the fluid F by the metering device 26.

Thus, the system 10 permits the filter aid material A to be replaced, as desired or required, which may be every cycle of the operation of the system 10, without the necessity of replacing the series of filters 82, 84 of the filtering arrangement 16.

Also, the system 10 of the present invention utilizes a metering device 26 which enables a plurality of filters 82, 84 to be employed in the system in series relationship relative to each other wherein the first filter 82 of the series comprises a filter aid material A which is readily and automatically replaced by fresh filter aid material as required in accordance with the demands placed on the system 10 and the second filter 84 is of a fine fibrous material which has a prolonged service due to the features of the first filter 82.

Also, the metering device 26 of the system 10 is provided with the structure 28 that prevents the bridging, bulking and hanging up of the filter aid material A which is confined therein together with the assembly 30 which measures and dispenses a predetermined quantity of the filter aid material A into the fluid F in accordance with the demands which are being placed on the filtering system 10.

In addition, the equipment 22 is effective in backwashing the fluid F in the system 10 for removing any contaminated filter aid material A which has formed on the coarse filter 82 and will collect the sludge and contaminated filter aid material A while enabling the portions of the fluid F which is backwashed to be returned to the reservoir of the system 10, and thus enable the contaminated filter aid material A and sludge to be readily removed from the system 10 without dismantling same.

While the invention has been described and disclosed in terms of an embodiment which it has assumed in practice, the scope of the invention should not be deemed to be limited by the precise embodiments herein shown, illustrated, described, and disclosed, and it is to be understood that other such embodiments are intended to be reserved, especially as they fall within the scope of the claims here subjoined.

What I claim as my invention is:
1. Apparatus for filtering liquids comprising:
   an enclosed chamber having a lower portion wherein a liquid may be contained and an upper portion communicating therewith wherein liquid vapors may be confined;
   a filter housing in the upper portion of the enclosed chamber;
   a foraminous filter support member dividing the filter housing into upper and lower sections;
   an exit conduit communicating with the upper section of the filter housing;
   an entry conduit communicating with the lower section of the filter housing;
   conduit means communicating with the lower portion of the enclosed chamber and with the entry conduit in the lower section of the filter housing;
   a metering device mounted above and in communication with the lower portion of the enclosed chamber for dispensing measured quantities of filter aid material into a liquid in the lower portion of the enclosed chamber; and
   means for urging liquid from the lower portion of the enclosed chamber through the foraminous member in the filter housing to form a layer of filter aid material in the lower section of the filter housing with the layer of filter aid material being supported by the foraminous member in the filter housing.

2. The apparatus of claim 1 further comprising:
   a fibrous filter member secured subjacent the foraminous member in the filter housing.

3. The apparatus of claim 1 wherein:
the filter housing has an opening in the lower portion thereof; and further comprising:
- a conduit communicating with the opening in the lower portion of the filter housing for passing liquid from the filter housing to the upper portion of the enclosed chamber; and
- a valve in the conduit for opening and closing the conduit passage.

4. The apparatus of claim 1 wherein:
the filter housing has a passage in the lower section thereof communicating with the upper portion of the enclosed chamber for passing liquid from the upper section of the filter housing through the foraminous member, through the lower section of the filter housing, through the upper portion of the enclosed chamber to the lower portion of the enclosed chamber for removing the layer of filter aid material supported by the foraminous member.

5. The apparatus of claim 4 further comprising:
a removable filter receptacle in the upper portion of the enclosed chamber for receiving liquid from the passage in the lower section of the filter housing, for collecting solid material carried by such liquid, and for passing such liquid through the filter receptacle to the lower portion of the enclosed chamber.

6. The apparatus of claim 5 further comprising:
a fibrous filter member secured subjacent the foraminous member in the filter housing.

7. The apparatus of claim 5 wherein the filter receptacle comprises a finely knit fabric receptacle.

8. The apparatus of claim 7 further comprising:
at least one additional filter receptacle; and wherein: said filter receptacles comprise finely knit nylon fabric bags.

9. The apparatus of claim 1 wherein the filter housing comprises:
upper and lower receptacles having complementary comating openings for securing a filter member therebetween subjacent the foraminous member; and further comprising:
- means for clamping the upper and the lower receptacles together to form a single divided filter housing having upper and lower sections.

10. The apparatus of claim 9 wherein:
the filter housing has a passage in the lower portion thereof; and further comprising:
- a conduit secured to the housing in communication with the passage in the lower portion thereof;
- a pressure sensitive valve in the conduit for closing the conduit passage responsive to a minimum pressure in the lower section of the filter housing when liquid is being pumped into the lower section of the filter housing and for opening the conduit passage when pressure in the lower section of the filter housing drops below a predetermined point; and
- wherein the metering device comprises:
  - a container mounted adjacent the enclosed chamber, said container having a passage in communication with the lower portion of the chamber;
  - a measuring member having pockets therein of predetermined volume disposed in the container for dispensing predetermined volumes of filter aid material through the communicating passage into the lower portion of the enclosed chamber;
  - means rotatably mounting the measuring member in the container;
  - means on the measuring member for directing filter aid material from the container into the pockets of the measuring member; and
  - means for rotating the measuring member to discharge predetermined volumes of filter aid material from the pockets in the measuring member through the communicating passage into the lower portion of the enclosed chamber.

11. The apparatus of claim 10 further comprising:
a disposable fibrous filter member secured subjacent the foraminous member in the filter housing.

12. The apparatus of claim 1 wherein the metering device comprises:
- a container mounted adjacent the upper portion of the chamber, said container having a passage in communication with the lower portion of the chamber;
- a measuring member in the container extending through the communicating passage into the enclosed chamber, said measuring member having pockets therein of predetermined volume;
- means rotatably mounting the measuring member in the container;
- means on the measuring member for directing filter aid material from the container into the pockets; and
- means for rotating the measuring member to carry the pockets individually through the communicating passage to deposit a predetermined volume of filter aid material from the pockets into the lower portion of the enclosed chamber.

13. The apparatus of claim 12 further comprising:
a fibrous filter member subjacent the foraminous member in the filter housing.

14. The apparatus of claim 12 wherein the filter housing comprises:
upper and lower receptacles having complementarily comating openings for securing a disposable filter member therebetween as well as subjacent the foraminous member for supporting the layer of filter aid material; and further comprising:
- means for clamping the upper and lower receptacles together to form a single divided filter housing having upper and lower sections therein.

15. The apparatus of claim 14 further comprising:
an agitator member disposed above the measuring member in the container, said agitating member having a plurality of passages therein;
legs extending downwardly from the agitating member to support the agitating member at a substantially fixed distance above the bottom of the container; and
means pivotally mounting the agitating member on the measuring member in eccentric relationship relative to the means for rotatably mounting the measuring member for causing the agitating member to sweep the container when the measuring member is rotated.

16. The apparatus of claim 15 wherein:
the agitating member is a sheet of expanded metal.

17. The apparatus of claim 15 wherein:
the legs engage the bottom of the container at locations beyond the peripheral extremities of the measuring member.

18. The apparatus of claim 1 wherein:
the filter housing has an opening in the lower portion thereof; and further comprising:
- a conduit secured to the filter housing in communication with the passage in the lower portion thereof; and
- a pressure sensitive valve is disposed in the conduit for closing the conduit passage when pressure in the lower section of the filter housing exceeds a predetermined level and for opening the conduit passage when the pressure in the lower section drops below a predetermined level.

19. The apparatus of claim 18 wherein the valve comprises:
- a valve seat in the conduit passage;
- a ball check resting above the valve seat; and
- means resiliently biasing the ball check upwardly from the valve seat for maintaining the valve in open condition when the pressure in the lower section of the filter housing is insufficient to overcome the bias force of the last stated means.

20. The apparatus of claim 19 wherein the filter housing comprises:
upper and lower receptacles having complementary comating openings for securing a disposable filter member therebetween below and adjacent the foraminous member; and
means for calmping the upper and the lower receptacles together to form a single divided filter housing having upper and lower sections therein.

21. Filtering apparatus comprising:
an enclosed chamber having a lower portion for containing liquid solvent and an upper portion communicating therewith for confining liquid solvent vapors therein;
a filter housing in the upper portion of the enclosed chamber;
a filter in the filter housing dividing the housing into upper and lower sections, the lower section having a passage communicating with the upper portion of the enclosed chamber, said filter comprising,
a foraminous filter support member,
a fibrous filter member supported subjacent the foraminous filter support member, and
a layer of particulate filter aid material supported on the underside of the fibrous filter member;
means for pumping the liquid from the lower portion of the enclosed chamber to the lower section of the filter housing through the filter to the upper section of the filter housing; and
a conduit secured to the filter housing communicating with the passage in the lower section thereof;
a pressure sensitive valve in the conduit for closing the conduit passage when liquid is pumped under pressure into the lower section of the filter housing and for opening the conduit passage when the liquid pressure is reduced below a predetermined point to automatically reverse the direction of flow through the filter when pumping is ceased to thereby remove the layer of filter aid material from the fibrous filter member.

22. The apparatus of claim 21 wherein the valve comprises:
a valve seat in the conduit passage;
a ball check resting above the valve seat; and
means resiliently biasing the ball check upwardly from the valve seat for maintaining the valve in open condition when the pressure in the lower section is sufficient to overcome the bias force of the last named means.

23. The apparatus of claim 21 further comprising:
a removable filter receptacle in the upper portion of the enclosed chamber for receiving liquid from the valved conduit when the pressure is reduced in the lower section of the filter housing, for collecting solid material carried by such liquid, and for passing such liquid to the lower portion of the enclosed chamber.

24. The apparatus of claim 21 further comprising:
a metering device mounted above and in communication with the lower portion of the enclosed chamber for dispensing measured quantities of filter aid material into liquid in the lower portion of the enclosed chamber.

25. The apparatus of claim 24 further comprising:
a removable filter receptacle in the upper portion of the enclosed chamber for receiving the liquid from the conduit when pressure in the lower section of the filter housing is reduced, for collecting solid material carried by such liquid, and for passing such liquid to the lower portion of the enclosed chamber.

26. The apparatus of claim 25 wherein the metering device comprises:
a container mounted adjacent the chamber and having a passage in communication with the chamber;
a measuring member in the container extending through the communicating passage into the chamber, the measuring member having pockets therein of predetermined volume;
means rotatably mounting the measuring member in the container;
means on the measuring member for directing filter aid material from the container into the pockets; and
means for rotating the measuring member to carry the pockets individually through the communicating passage to deposit a predetermined volume of filter aid material from the pockets into liquid in the lower portion.

27. Filter apparatus comprising:
an enclosed chamber having a lower portion for containing liquid solvent and an upper portion communicating therewith for confining liquid solvent vapors therein;
an inverted receptacle in the upper portion of the enclosed chamber having an exit passage extending exteriorly of the enclosed chamber and a downwardly facing opening;
an upright receptacle complementarily comating with the inverted receptacle to form an enclosed filter housing, said upright receptacle having an entry aperture and a discharge aperture therein;
a foraminous member in the filter housing dividing said filter housing into upper and lower sections;
a disposable fibrous filter member adjacent the foraminous member secured by the openings in the inverted and the upright receptacles in overlying relationship relative to the foraminous member;
conduit means secured to the upright receptacle in communication with the entry aperture therein and communicating with the lower portion of the enclosed chamber for carrying liquid from the lower portion of the enclosed chamber to the lower section of the filter housing;
means for urging the liquid to flow from the lower portion of the enclosed chamber, through the conduit means, through the lower section of the filter housing, the fibrous filter member, the foraminous filter member, the upper section of the filter housing and through the exit passage from the upper section of the filter housing;
a discharge conduit secured in communication with the discharge aperture in the upright receptacle;
a pressure operated ball check valve disposed in the discharge conduit for permitting liquid to flow therethrough when the pressure in the lower section of the filter housing drops below a predetermined value for automatically reversing the direction of flow through the foraminous member and the fibrous filter member under such pressure conditions in the lower section of the filter housing;
a closely knit fiber filter receptacle in the upper portion of the enclosed chamber for receiving liquid from the discharge conduit, for collecting solids carried by such liquid, and passing such liquid to the lower portion of the enclosed chamber; and
a metering device mounted adjacent and in communication with the enclosed chamber above the lower portion of the enclosed chamber for periodically dispensing a measured amount of filter aid material into liquid in the lower portion of the enclosed chamber;
whereby when liquid is urged to flow from the lower portion of the enclosed chamber to the lower section of the filter housing through the fibrous filter member in the filter housing, a layer of filter aid material is deposited on the underside of the fibrous filter member to form an additional filter layer and whereby said additional filter layer is automatically removed when pressure in the lower section of the filter housing drops below the predetermined point and the filter aid material forming the additional filter layer is collected in the closely knit fiber filter receptacles in the upper portion of the enclosed chamber and liquid is returned to the lower portion of the enclosed chamber.

References Cited

UNITED STATES PATENTS

| | | | |
|---|---|---|---|
| 2,312,604 | 3/1943 | Thompson | 210—136 X |
| 2,367,557 | 1/1945 | Atwood | 210—75 X |
| 2,368,127 | 1/1945 | Fasick | 222—232 |
| 2,788,126 | 4/1957 | Gardes et al. | 210—262 X |
| 2,937,752 | 5/1960 | Deschere | 210—193 X |
| 3,100,191 | 8/1963 | Smith et al. | 210—193 X |
| 3,151,065 | 9/1964 | Smith et al. | 210—138 X |

SAMIH N. ZAHARNA, *Primary Examiner.*

REUBEN FRIEDMAN, *Assistant Examiner.*